United States Patent Office 3,356,746
Patented Dec. 5, 1967

3,356,746
PREPARATION OF 2,2,2-TRIFLUOROETHANOL BY CATALYTIC HYDROGENATION
Louis G. Anello, Basking Ridge, and William J. Cunningham, Rockaway, N.J., assignors to Allied Chemical Corporation, New York, N.Y., a corporation of New York
No Drawing. Filed Sept. 30, 1964, Ser. No. 400,562
14 Claims. (Cl. 260—633)

This invention relates to the preparation of 2,2,2-trifluoroethanol by the catalytic hydrogenation of 2,2,2-trifluoroethyl trifluoroacetate.

Trifluoroethanol is a known compound and can be prepared by a process involving a high pressure, high temperature reaction of trifluoroethyl chloride with potassium acetate followed by saponification of the resulting acetate ester. This and other suggested prior procedures are relatively complicated and not satisfactory for economical commercial use. It is an object of the present invention to provide a process for making trifluoroethanol from 2,2,2-trifluoroethyl trifluoroacetate by an easily controllable, catalytic gas phase reaction carried out at ordinary pressure and at relatively low temperature.

Thus in accordance with this invention, hydrogen is reacted with 2,2,2-trifluoroethyl trifluoroacetate in vapor phase at a temperature within the range of about 200° to 400° C. in the presence of a catalyst consisting essentially of a noble metal selected from the class consisting of ruthenium, rhodium, palladium, platinum, osmium and iridium.

The reaction proceeds according to the equation $$CF_3CO_2CH_2CF_3 + 2H_2 \rightarrow 2CF_3CH_2OH$$

with conversions ranging up to 21% and yield based on trifluoroethyl trifluoroacetate consumed ranging up to about 70%.

The reaction conditions include a temperature within the range of about 200° to 400° C., preferably within the range of about 225° to 325° C., a pressure of atmospheric to 5 atmospheres, a hydrogen to trifluoroethyl trifluoroacetate mole ratio of about 2 to 50:1 respectively, and a space velocity of within the range of about 100 to 1000, preferably within the range of about 200 to 400, the space velocity being the volumes of reactant gas measured at room temperature per volume of catalyst in the reactor per hour. At temperatures lower than about 200° C., little or no reaction is obtained, whereas at temperatures above about 400° C., there is marked fragmentation of organic material with the formation of undesired by-products such as $CHF_3$, $CO_2$, HF and carbon. It is desirable to adjust hydrogen and 2,2,2-trifluoroethyl trifluoroacetate reactant flows, temperature, and space velocity so that hydrogen is completely reacted in order to avoid expensive separation processes.

Exiting from the reaction zone are $CF_3CH_2OH$ (Boiling Point 74.5° C.) together with unreacted $$CF_3CO_2CH_2CF_3$$

(Boiling Point 55° C.) and some hydrogen. Gaseous products of the reaction can be isolated by suitable cooling, such as in a Dry Ice acetone trap. By this procedure, unreacted hydrogen passes through the trap while $$CF_3CH_2OH$$

and unreacted $CF_3CO_2CH_2CF_3$ are obtained as condensate in the trap. The $CF_3CH_2OH$ product can be recovered from the condensate by fractional distillation.

The catalysts useful in the process of this invention are the conventional noble metal catalysts useful in the vapor phase reduction of an acid or an ester to an alcohol. These catalysts are commercially available and can be prepared by well known methods. For example, they can be prepared by any of the methods described in "Catalysis," Paul H. Emmet, Reinhold Publishing Corp. (1954), volume 1, pages 338–340. Advantageously, the catalysts are supported of an inactive solid carrier such as fuller's earth, silica, magnesia, alumina and carbon, preferably alumina or carbon. Such supported catalysts are usually prepared by wetting the support with an aqueous solution of chloroplatinic acid, chloropalladic acid, or the like, or with an aqueous solution of the ammonium salts of these acids, drying the impregnated support at 105–110° C. and reducing in a hydrogen atmosphere between 100 to 450° C. When supported on an inactive carrier, the finished noble metal catalysts contain within the range of about 0.5 to 10.0% by weight of noble metal based on the weight of inactive carrier, preferably about 0.5 to 5%.

The following examples illustrate in detail the method of this invention.

*Example I*

The catalyst used in this example was a commercially available ruthenium on alumina catalyst containing 0.5% ruthenium based on the weight of alumina. About 100 cubic centimeters of catalyst were charged into a ⅝ inch internal diameter fused alumina (Alundum) tubular reactor 36 inches long externally heated over 30 inches of length by an electric furnace provided with automatic temperature control.

Internal temperature of the reactor was maintained to 265° C. and a mixture consisting of about 183 grams (0.94 mole) of $CF_3CO_2CH_2CF_3$ and about 1.88 moles (46 liters) of hydrogen were passed into and through the reactor at a volume hourly space velocity of 240 and a 15 second retention time during a period of 5 hours. Exit products from the reactor were passed into and through a trap cooled by Dry Ice-acetone wherein organic material was condensed. Fractional distillation of the cold trap condensate effected recovery of 45 grams (0.23 mole) of $CF_3CO_2CH_2CF_3$ (B.P. 55° C.) and 40 grams (0.40 mole) of $CF_3CH_2OH$ (B.P. 74.5° C.). Thus, of the organic material feed, 21% was converted to the alcohol.

*Example II*

The catalyst used in this example was a commercially available palladium on activated carbon catalyst containing 3% palladium based on the weight of carbon. About 100 cubic centimeters of catalyst were charged to the reactor described in Example I. Reactor temperature was 265° C. and a mixture of 94 grams (0.48 mole) of $$CF_3CO_2CH_2CF_3$$

and 1.08 moles of hydrogen were passed into and through the reactor during a period of 2.75 hours at a volume hourly space velocity of 240 and a 15 second retention time. Exit products were condensed and recovered as described in Example I. Fractional distillation of the cold trap condensate, 101 grams, effected recovery of 81 grams (0.41 mole) of $CF_3CO_2CH_2CF_3$ and 95 grams (0.095 mole) of $CF_3CH_2OH$. Conversion to the alcohol was 14.4% and yield based on organic material consumed was 70%.

Trifluoroethanol is useful for a variety of purposes. For example, it is useful as a starting material for the production of trifluoroethyl vinyl ether, $CF_3CH_2OCH=CH_2$, an anesthetic. Trifluoroethanol can also be used as a refrigerant or copolymerized with, for example, methacrylic acid chloride, to give polymers with low refractive indexes and high relative dispersions.

The embodiments of the invention in which an exclusive property or privilege is claimed are defined as follows:

1. A method for the preparation of 2,2,2-trifluoroethanol which comprises passing a vaporous mixture of 2,2,2- trifluoroethyl trifluoroacetate and hydrogen at a temperature within the range of about 200° C. to 400° C. and at a pressure of one to five atmospheres through a reactor containing a catalyst consisting essentially of a noble metal selected from the group consisting of ruthenium, rhodium, palladium, platinum, osmium, and iridium, and separating 2,2,2-trifluoroethanol from the resulting reaction mixture.

2. The method of claim 1 wherein the catalyst comprises the noble metal supported on an inactive solid carrier.

3. The method of claim 1 wherein the catalyst comprises the noble metal supported on an inactive solid carrier and wherein the catalyst contains within the range of about 0.5 to 10% by weight of noble metal based on the weight of the carrier.

4. The method of claim 1 wherein the catalyst comprises the noble metal supported on an inactive solid carrier and wherein the catalyst contains within the range of about 0.5 to 5% by weight of noble metal based on the weight of the carrier.

5. The method of claim 1 wherein the catalyst comprises the noble metal supported on alumina.

6. The method of claim 1 wherein the catalyst comprises the noble metal supported on activated carbon.

7. The method of claim 1 wherein the catalyst is ruthenium on alumina.

8. The method of claim 1 wherein the catalyst is palladium on carbon.

9. A method for the preparation of 2,2,2-trifluoroethanol which comprises passing a vaporous mixture of 2,2,2-trifluoroethyl trifluoroacetate and hydrogen, wherein the hydrogen to 2,2,2-trifluoroethyl trifluoroacetate mole ratio is 2 to 50:1, at a temperature within the range of about 200° C. to 400° C., at a pressure of one to five atmospheres, and at a volume hourly space velocity in the range of about 100 to 1000 through a reactor containing a catalyst consisting essentially of a noble metal selected from the group consisting of ruthenium, rhodium, palladium, platinum, osmium and iridium supported on an inactive solid carrier, and separating 2,2,2-trifluoroethanol from the resulting reaction mixture.

10. The method of claim 9 wherein the catalyst is ruthenium on alumina.

11. The method of claim 9 wherein the catalyst is palladium on carbon.

12. A method for the preparation of 2,2,2-trifluoroethanol which comprises passing a vaporous mixture of 2,2,2-trifluoroethyl trifluoroacetate and hydrogen, wherein the hydrogen to 2,2,2-trifluoroethyl trifluoroacetate mole ratio is 2 to 50:1, at a temperature within the range of about 225° C. to 335° C., at a pressure of about one atmosphere, and at a volume hourly space velocity within the range of about 200 to 400 through a reactor containing a catalyst consisting essentially of a noble metal selected from the group consisting of ruthenium, rhodium, palladium, osmium, and iridium supported on an inactive solid carrier, and separating 2,2,2-trifluoroethanol from the resulting reaction mixture.

13. The method of claim 12 wherein the catalyst is ruthenium on alumina.

14. The method of claim 13 wherein the catalyst is palladium on carbon.

References Cited
UNITED STATES PATENTS 2,776,276　1/1957　Glasebrook et al. ____ 260—638

FOREIGN PATENTS 1,190,705　10/1959　France.

LEON ZITVER, *Primary Examiner.*

N. J. KING, JR., H. MARS, *Assistant Examiners.*